United States Patent
Leman et al.

(12)

(10) Patent No.: US 6,562,470 B2
(45) Date of Patent: May 13, 2003

(54) METHOD FOR MAKING COATED SUBSTRATES AND ARTICLES MADE THEREBY

(75) Inventors: John Thomas Leman, Niskayuna, NY (US); Judith Stein, Schenectady, NY (US); Kathryn Ann Shaffer, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/757,245

(22) Filed: Jan. 10, 2001

(65) Prior Publication Data

US 2002/0127412 A1 Sep. 12, 2002

(51) Int. Cl.[7] .................... B32B 9/04; B32B 15/04; B05D 1/36; B05D 1/02; B05D 1/28
(52) U.S. Cl. .................... 428/448; 428/447; 428/450; 428/457; 428/689; 428/352; 427/387; 427/391; 427/407.11; 427/411; 427/421; 427/428; 106/287.1
(58) Field of Search .................... 106/287.1; 428/448, 428/447, 352, 450, 457, 689; 427/387, 391, 407.1, 411, 421, 428; 502/262, 232, 240, 258, 150, 158; 556/136

(56) References Cited

U.S. PATENT DOCUMENTS 5,529,822 A * 6/1996 Togashi et al. .......... 106/287.1
5,977,280 A * 11/1999 Kadlec et al. .............. 106/900
6,077,611 A * 6/2000 Griswold et al. ........... 428/352

FOREIGN PATENT DOCUMENTS

WO    9525734    9/1995

OTHER PUBLICATIONS

"Efficient Homogeneous Hydrosilylation of Olefins by Use of Complexes of PT With Selected Electron–Defocoemt P;efoms as :ogamds", P. Steffanut, J.A. Osborn, A. DeCian & J. Fisher, Chem. Eur. J. 1998, 4. No. 10, pp. 2008–2017.

* cited by examiner

*Primary Examiner*—Robert Dawson
*Assistant Examiner*—Michael J Feely
(74) *Attorney, Agent, or Firm*—Bernadette M. Bennett; Noreen C. Johnson

(57) ABSTRACT

A method for making a coated substrate, a system, and articles made thereby are provided wherein the coated substrate comprises a coating composition and a substrate. The coating composition comprises an alkenyl functional compound and a hydride functional compound, and the substrate comprises a catalytically effective amount of a platinum group metal catalyst having the formula $Z_xPt(0)L_y$ wherein L comprises an electron-withdrawing ester ligand, a quinone-based ligand, or combination thereof, y is in a range between about 1 and about 4, Z comprises a coordinating ligand, and x is in a range between 0 and about 3 wherein x+y is in a range between about 2 and about 4.

51 Claims, No Drawings

METHOD FOR MAKING COATED SUBSTRATES AND ARTICLES MADE THEREBY

BACKGROUND OF THE INVENTION

The present invention relates to low temperature curable coatings, more particularly to addition curable organopolysiloxane coatings that cure rapidly at low temperature.

Addition curable release coating compositions and their use as release coatings are known, see, for example, coassigned U.S. Pat. No. 4,448,815. A layer of such coating is typically applied to a substrate, such as paper, from a reactive coating bath which contains an alkenyl-functional organopolysiloxane, a hydride-functional organopolysiloxane, an organoplatinum complex and a cure inhibitor. Once applied, the layer of coating is cured by exposing the coated substrate to elevated temperature.

The cure inhibitor retards cure of the coating and enables a balance between a long useful coating bath life at low temperature and rapid cure speed at elevated temperature to be maintained. There is a constant desire in the art to provide increased cure speed without compromising bath life.

The need to subject the coated substrate to elevated temperature to cure the coating layer introduces some drawbacks to the use of the process for addition cure organopolysiloxane release coatings. These drawbacks are in the form of energy costs, a need to rehydrate coated paper substrates after curing and a limited ability to use such coatings to coat temperature sensitive substrates, such as, for example, some polymer films. Due to these drawbacks, there is a desire in the art to provide coatings that are curable at lower temperature without compromising bath life.

BRIEF SUMMARY OF THE INVENTION

The present invention provides a method of making a coated substrate comprising:

applying a coating composition to a substrate, wherein the coating composition comprises an alkenyl functional compound and a hydride functional compound, and the substrate comprises a catalytically effective amount of a platinum group metal catalyst having the formula $Z_xPt(0)L_y$, wherein L comprises an electron-withdrawing ester ligand, a quinone-based ligand, or combination thereof, y is in a range between about 1 and about 4, Z comprises a coordinating ligand, x is in a range between 0 and about 3, and x+y is in a range between about 2 and about 4; and allowing the coating composition to cure.

The present invention further provides a system for making a coated substrate comprising a coating composition, said coating composition comprising an alkenyl functional compound and a hydride functional compound, and a substrate having a platinum group metal catalyst having the formula $Z_xPt(0)L_y$, wherein the catalyst is disposed on at least one surface of the substrate in an amount effective to catalyze cure of the coating composition when the coating composition is applied to the substrate.

The present invention further provides a catalyzed article comprising a substrate comprising papers, polymer films, polymer coated papers, metal foils, or combinations thereof, and a platinum group metal catalyst having the formula $Z_xPt(0)L_y$ disposed on at least one surface of the substrate.

DETAILED DESCRIPTION OF THE INVENTION

It has been found that the use of a platinum group metal catalyst which comprises an electron-withdrawing ester ligand, a quinone-based ligand, or combination thereof is capable of catalyzing the cure of an addition curable siloxane coating composition of this invention. The catalyst has the formula $Z_xPt(0)L_y$, wherein L comprises an electron-withdrawing ester ligand, a quinone-based ligand, or combination thereof, y is in a range between about 1 and about 4, Z comprises a coordinating ligand, x is in a range between 0 and about 3, and x+y is in a range between about 2 and about 4. Suitable examples of L include amides and esters of maleic acid, maleimides, maleic anhydride; fumarates such as dimethylfumarate and dioctylfumarate; electron deficient ene-dione compounds such as 1,4-naphthoquinone, 1,4-benzoquinones, and 2-methyl-1,4-naphthoquinone; and mixtures of divinylsiloxanes and electron deficient ligands. In some instances, the catalyst can be formed in situ by adding a platinum group metal catalyst to the ligand, L. In addition, the ligand, L, can be present in excess to provide a mixture of the catalyst and L.

The coordinating ligand, Z, is typically an organic compound with at least one alkenyl group, for example, 1,1,3,3-tetramethyl-1,3-divinyldisiloxane (also referred to as $M^{Vi}M^{Vi}$); octavinylcyclotetrasiloxane (also referred to as $D_4^{Vi}$); cyclooctadiene; ethylene; or combinations thereof. Preferably, the coordinating ligand has at least two alkenyl groups.

Preferably, Z is 1,1,3,3-tetramethyl-1,3-divinyldisiloxane and L is 2-methyl-1,4-naphthoquinone wherein x is 1 and y is 1 or Z is 1,1,3,3-tetramethyl-1,3-divinyldisiloxane and L is dioctylfumarate wherein x is 1 and y is in a range between about 1 and about 3.

The catalyst is used in a catalytically effective amount. "Catalytically effective amount" as used herein refers to an amount effective to catalyze the cure of a layer of coating disposed on the substrate. In a preferred embodiment, the catalyst-containing substrate contains greater than about 0.000001 grams, more preferably in a range between about 0.00005 grams and about 0.01 grams, and still more preferably, in a range between about 0.0005 grams and about 0.001 grams, of organoplatinum complex per square meter of substrate surface.

Addition curable siloxane coating compositions include alkenyl functional organopolysiloxanes and hydride functional organopolysiloxanes. Alkenyl functional organopolysiloxanes suitable for use for the present invention are those including structural units of the formula (I):

$$R^1_a SiO_{4-a/2} \tag{I}$$

wherein each $R^1$ is independently at each occurrence a monovalent hydrocarbon radical, and a is an integer wherein $0 \leq a \leq 3$, provided that at least two $R^1$ groups per molecule of such alkenyl functional organopolysiloxane are each independently alkenyl radicals.

As used herein "monovalent hydrocarbon radical" means a monovalent acyclic hydrocarbon radical, a monovalent alicyclic hydrocarbon radical, or a monovalent aromatic hydrocarbon radical.

As used herein, the terminology "acyclic hydrocarbon radical" means a monovalent straight chain or branched hydrocarbon radical, preferably containing carbon atoms in a range between about 2 and about 20 radicals, which may be saturated or unsaturated and which may be optionally substituted or interrupted with one or more functional groups, such as, for example, carboxyl, cyano, hydroxy, halo and oxy. Suitable monovalent acyclic hydrocarbon radicals include, but are not limited to, for example, alkyl, alkenyl, alkynyl, hydroxyalkyl, cyanoalkyl, carboxyalkyl, carboxamide, alkylamido and haloalkyl, such as, for example, methyl, ethyl, sec-butyl, tert-butyl, octyl, decyl, dodecyl, cetyl, stearyl, ethenyl, propenyl, butynyl, hydroxypropyl, cyanoethyl, carboxymethyl, chloromethyl and 3,3,3-fluoropropyl.

As used herein the term "alkyl" means a saturated straight or branched monovalent hydrocarbon radical. Monovalent alkyl groups are typically selected from linear or branched alkyl groups containing carbons in a range between about 1 and about 12 per group, such as, for example, methyl, ethyl, propyl, iso-propyl, n-butyl, iso-butyl, sec-butyl, tert-butyl, pentyl, hexyl, heptyl, decyl, and dodecyl.

As used herein the term "alkenyl" means a straight or branched monovalent unsaturated hydrocarbon radical, preferably on the terminus and containing carbon atoms in a range between about 2 and about 10 per radical, such as, for example, ethenyl, 2-propenyl, 3-butenyl, 5-hexenyl, 7-octenyl, and ethenylphenyl.

As used herein, the terminology "monovalent alicyclic hydrocarbon radical" means a monovalent radical containing one or more saturated hydrocarbon rings, typically containing carbon atoms in a range between about 4 and about 10 per ring, per radical which may optionally be substituted on one or more of the rings with one or more alkyl radicals, each preferably containing carbon atoms in a range between about 2 and about 6 per group, halo radicals or other functional groups and which, in the case of a monovalent alicyclic hydrocarbon radical containing two or more rings, may be fused rings. Suitable monovalent alicyclic hydrocarbon radicals include, but are not limited to, for example, cyclohexyl and cyclooctyl.

As used herein, the terminology "monovalent aromatic hydrocarbon radical" means a monovalent hydrocarbon radical containing one or more aromatic rings per radical, which may be substituted on the aromatic rings with one or more alkyl radicals, each typically containing carbon atoms in a range between about 2 and about 6 per group, halo radicals or other functional groups and which, in the case of a monovalent aromatic hydrocarbon radical containing two or more rings, may be fused rings. Suitable monovalent aromatic hydrocarbon radicals include, but are not limited to, for example, phenyl, tolyl, 2,4,6-trimethylphenyl, 1,2-isopropylmethylphenyl, 1-pentalenyl, naphthyl, and anthryl.

In one embodiment of the present invention, the alkenyl functional organopolysiloxane comprises one or more organopolysiloxane polymer of the formula (II):

(II)

wherein $M^1$ is $R^2_3SiO_{1/2}$,
$M^{Vi}$ is $R^3_2R^4SiO_{1/2}$,
$D^1$ is $R^5_2SiO_{2/2}$,
$D^{Vi}$ is $R^6R^7SiO_{2/2}$,
$T^1$ is $R^8SiO_{3/2}$,
$T^{Vi}$ is $R^9SiO_{3/2}$,
Q is $SiO_{4/2}$,
each $R^2$, $R^3$, $R^5$, $R^6$ and $R^8$ is independently at each occurrence hydroxyl or a monovalent hydrocarbon radical,
each $R^4$, $R^7$ and $R^9$ is independently at each occurrence alkenyl,
b, c, d, e, f, g and h are each integers selected to provide a polymer with a viscosity in a range between about 50 centistokes and about 50,000 centistokes and having a desired amount of alkenyl groups per molecule, provided at least one of c, e and g is greater than 0, so that the alkenyl functional organopolysiloxane contains at least two alkenyl radicals per molecule.

In yet another embodiment of the present invention, $R^2$, $R^3$, $R^5$, $R^6$ and $R^8$ are each $(C_1–C_6)$alkyl, most preferably methyl, and $R^4$, $R^7$ and $R^9$ are each independently at each occurrence a terminally unsaturated $(C_2–C_6)$alkenyl radical, more preferably, ethenyl or 5-hexenyl.

In another embodiment of the present invention, the coefficients b, c, d, e, f, g and h are selected to provide a viscosity in a range between about 100 centistokes and about 1000 centistokes, more preferably in a range between about 150 centistokes and about 500 centistokes.

In yet another embodiment of the present invention, the alkenyl functional organopolysiloxane comprises one or more compounds selected from linear alkenyl-stopped dialkylsiloxane polymers of the formula $M^{Vi}_2D^1_d$, branched alkenyl-stopped dialkylsiloxane polymers of the formula $M^1_bM^{Vi}_cD^1_dT^1_f$, siloxane polymers of the formula $M^1_bM^{Vi}_cQ^1_h$, and alkenyl-stopped alkylalkenyl dialkylpolysiloxane copolymers of the formula $M^1_bM^{Vi}_cD^1_dD^{Vi}_c$, wherein $M^1$, $M^{Vi}$, $D^1$, $D^{Vi}$, $T_f$, Q, b, c, d, e, and h are each defined as above, and wherein $R^2$, $R^3$, $R^5$, $R^6$ and $R^8$ are each alkyl, preferably methyl, and wherein $R^4$ and $R^7$ are each preferably ethenyl.

Hydride functional organopolysiloxanes suitable for the present invention are those including structural units of the structural formula (III):

$$R^{10}_iSiO_{4-i/2} \quad\quad (III)$$

wherein each $R^{10}$ is independently at each occurrence hydrogen or a monovalent hydrocarbon radical, and
i is an integer wherein $0 \leq i \leq 3$,
provided that at least two $R^{10}$ groups per molecule of such hydride functional organopolysiloxane are each hydrogen.

In a preferred embodiment, the hydride functional organopolysiloxane is an organopolysiloxane of the structural formula (IV):

$$M^2_jM^H_kD^2_lD^H_mT^2_nT^H_oQ_p \quad\quad (IV)$$

wherein $M^2$ is $R^{11}_3SiO_{1/2}$,
$M^H$ is $R^{12}_2R^{13}SiO_{1/2}$,
$D^2$ is $R^{14}_2SiO_{2/2}$,
$D^H$ is $R^{15}R^{16}SiO_{2/2}$,
$T^2$ is $R^{17}SiO_{3/2}$,
$T^H$ is $R^{18}SiO_{3/2}$,
Q is defined above,
each $R^{11}$, $R^{12}$, $R^{14}$, $R^{15}$ and $R^{17}$ is independently at each occurrence a monovalent hydrocarbon radical,
$R^{13}$, $R^{16}$ and $R^{18}$ are each H, and
j, k, l, m, n, o and p are each integers selected to provide a polymer having a viscosity in a range between about 1 centistokes and about 1000 centistokes and a desired amount of silicon-bonded H radicals per molecule, provided at least one of k, m and o is greater than 0, so that the hydride functional organopolysiloxane contains at least two silicon-bonded H. radicals per molecule.

In one embodiment of the present invention, $R^{11}$, $R^{12}$, $R^{14}$ and $R^{15}$ are each $(C_1–C_6)$alkyl, most preferably methyl.

In another embodiment of the present invention, the coefficients j, k, l, m, n, o and p are selected to provide a polymer having a viscosity in a range between about 10 centistokes and about 150 centistokes, more preferably in a range between about 20 centistokes and about 80 centistokes.

In yet another embodiment of the present invention, the hydride functional organopolysiloxane comprises one or more compounds selected from triialkylsiloxy-stopped alkyl hydrogen polysiloxanes of the formula $M^2{}_jD^H{}_m$ and trialkylsiloxy-stopped alkyl hydrogen dialkylpolysiloxane copolymers of the formula $M^2{}_jD^2{}_lD^H{}_m$, wherein $M^2$, $D^2$, $D^H$, j, l, and m are each defined as above, and wherein $R^{11}$, $R^{14}$ and $R^{15}$ are each alkyl, preferably methyl.

For the organopolysiloxane to form a cross-linked network, if the hydride functional organopolysiloxane contains at least two hydride groups per molecule, then the alkenyl functional organopolysiloxane contains at least three alkenyl groups per molecule. Alternatively, if the alkenyl functional organopolysiloxane contains at least two alkenyl groups per molecule, then the hydride functional organopolysiloxane contains at least three hydride groups per molecule.

In an alternative embodiment of the present invention, the coating composition comprises an organopolysiloxane having both alkenyl and hydride radicals present on the same molecule, such as for example the organopolysiloxanes disclosed in coassigned U.S. Pat. Nos. 5,698,654 and 5,753,751.

In still another embodiment of the present invention, the alkenyl and hydride functional organopolysiloxane comprises one or more organopolysiloxanes of the formula (V):

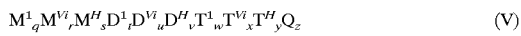

$$M^1{}_qM^{Vi}{}_rM^H{}_sD^1{}_tD^{Vi}{}_uD^H{}_vT^1{}_wT^{Vi}{}_xT^H{}_yQ_z \qquad (V)$$

wherein $M^1$, $M^{Vi}$, $M^HD^1$, $D^{Vi}$, $D^H$, $T^1$, $T^{Vi}$, $T^H$, Q are each defined as above and q, r, s, t, u, v, w, x, y and z are each integers selected to provide a polymer having a viscosity in a range between about 50 centistokes and about 50,000 centistokes and having a desired amount of alkenyl groups and silicon-bonded H radicals per molecule, provided that each molecule contains at least two alkenyl groups, at least two silicon-bonded H radicals, or combination thereof such that the total number of alkenyl groups and silicon-bonded H radicals on the molecule is at least five.

In yet another embodiment of the present invention, the coating composition has a molar ratio of silicon bonded hydrogen on the hydride functional organopolysiloxane to alkenyl groups on the alkenyl functional organopolysiloxane ("Si-H:alkenyl ratio") in a range between about 1:5 and about 5:1, more preferably in a range between about 1:1 and about 4:1 and even more preferably in a range between about 1.2:1 and about 2.5:1.

The coating composition used in the method of the present invention may optionally include other components known in the art, such as, for example, nonreactive diluents, such as for example, solvents such as water, hydrocarbon fluids, and non-functionalized silicone oils.

Substrates suitable for use in the method of the present invention include paper, such as for example, supercalendered kraft paper; glassine paper; machine finished paper; and machine glazed paper; and polymer films, such as, for example, polyolefins, polyesters and polystyrenics; metal foils, such as, for example, aluminum foil; and composite substrates, such as, for example, polyolefin coated kraft paper.

In one embodiment of the present invention, a dilute form of the catalyst is made by dissolving the catalyst in a solvent, such as for example, hexane, heptane, octane or a mixture thereof or an organopolysiloxane, or by dispersing the catalyst in a binder composition, for example, a binder composition for finishing paper comprising a polymer latex and an inorganic filler, or by dispersing the catalyst in a film forming polymer composition, such as, for example, polyvinyl alcohol or a polyacrylate composition, and the dilute form of catalyst is applied to the substrate, by for example, spray coating, roll coating, rod coating or extrusion, to form a catalyst-containing substrate.

Alternatively, the catalyst is dissolved in an alkenyl functional organopolysiloxane and a layer of the alkenyl functional organopolysiloxane/catalyst solution is applied to the substrate.

A layer of the coating composition is applied to the substrate by, for example, spray coating, roll coating, rod coating or extrusion and allowed to cure. The layer of coating composition may be allowed to cure at uncontrolled ambient temperature or may be allowed to cure at an elevated temperature, such as for example, a temperature of up to about 100° C., and more preferably up to about 70° C.

The coated substrate made by the method of the present invention is useful as a release liner for pressure sensitive adhesive-backed articles such as, for example, adhesive labels and adhesive tapes.

An adhesive laminate comprises a coated substrate made by the method of the present invention laminated with a pressure sensitive adhesive coated substrate, such that the cured coating layer of the coated substrate made by the method of the present invention is in contact with the pressure sensitive adhesive layer on the pressure sensitive adhesive coated substrate. Suitable pressure sensitive adhesive compositions, such as, for example, emulsion acrylic adhesives, solvent acrylic adhesives, hot melt adhesives, emulsion rubber adhesive, solvent rubber adhesives, and methods for making pressure sensitive adhesive coated substrates are well known in the art. The pressure sensitive adhesive coated substrate may be easily removed from the coated substrate made by the method of the present invention and applied to another substrate, as desired.

In order that those skilled in the art will be better able to practice the present invention, the following examples are given by way of illustration and not by way of limitation.

EXAMPLE 1

Solutions of organoplatinum complexes in n-heptane (0.0005 moles/liter) were coated on Kammerer AV100 glassine paper using a #3 Meyer rod and the solvent was then flashed off for 10 seconds at 70° C. in a forced air oven to form a platinum coated paper substrate. A mixture of 50 parts by weight ("pbw") of a vinyl-stopped dimethylsiloxane polymer (formula $M^{Vi}{}_2D^1{}_d$, wherein $M^{Vi}$, $D^1$ and d are each as described above, and $R^3$ and $R^5$ are each methyl, $R^4$ is ethenyl, and exhibiting a viscosity of about 225 centistokes) and 2.5 pbw of a trimethylsilyl-stopped methylhydrogen dimethyl polysiloxane copolymer (formula $M^2{}_2D^2{}_lD^H{}_m$, wherein $M^2$, $D^2$, $D^H$, l and m are each as described above, $R^{11}$, $R^{14}$ and $R^{15}$ are each methyl and $R^{16}$ is H, containing approximately 1 weight % hydride radicals and exhibiting a viscosity of about 35 centistokes) was applied to the platinum-containing paper substrate in a bead and drawn down across the paper with a straight metal edge. The catalyzed and coated paper was cured for 10 seconds in a forced air oven at 70° C., and the coating analyzed immediately upon removal from the oven. Concentration of the organoplatinum catalyst solution was 5×10⁻⁴ moles per liter.

Areal coverage of organoplatinum catalyst on the coated paper substrate was determined by acid digestion, followed by analysis of the. digested solution for total platinum by inductively coupled plasma- mass spectrometry (ICP-MS). The total amount of platinum (Pt) determined by ICP-MS, divided by the measured area of the paper sample analyzed provides the concentration of platinum on the substrate in units of mass platinum/area.

For quantitative analysis of the extent of cure, the following procedure was utilized to determine the percent extractables in the coating. A 3.5 centimeter (cm) diameter circle was cut from the center of the coated paper, and the silicone polymer coatweight was determined by X-ray fluorescence analysis on an Oxford Instruments Model Lab X3000 spectrometer. The paper circle was then soaked in 10 milliliters (mL) of hexanes for 30 minutes, the paper specimen was carefully removed and the solvent allowed to evaporate at room temperature. The dried, solvent-extracted paper was re-analyzed on the Oxford XRF instrument to determine the amount of cured, crosslinked silicone coating remaining. The ratio of the residual silicone coating on the extracted specimen to the amount of silicone coating on the original as-cured sample provides a measure of the degree of cure of the sample, and therefore a measure of solvent-extractable silicone in the coating by difference. Typically, it is desirable in the art to have an extractable level of less than or equal to 10%.

TABLE 1

| Sample | Catalyst | % Extractables Trial 1 (t = 0) | Trial 2 (t = 0) | Average (t = 0) | t = 4 days | $\mu g$ Pt/m$^2$ |
|---|---|---|---|---|---|---|
| 3 | $(C_{10}H_{12})PtCl_2$ | 22.63 | 18.51 | 20.57 | No cure | 676 |
| 4 | $(M^{Vi}M^{Vi})Pt(1,4-$ naphthoquinone) | 10.38 | 11.64 | 11.01 | No cure | 502 |
| 1 | Karstedt + dioctylfumarate | 5.62 | 1.57 | 3.60 | 7.42 | 870 |
| 2 | $(M^{Vi}M^{Vi})Pt$ (dimethylfumarate) | 2.75 | 3.91 | 3.33 | No cure | 695 |
| 6 | Karstedt | 2.16 | 3.08 | 2.62 | No cure | 1278 |
| 7 | $(M^{Vi}M^{Vi})Pt(2-methyl-$ 1,4-napthoquinone) | 2.38 | 3 | 2.69 | No cure | 1287 |

Karstedt's catalyst is disclosed in U.S. Pat. No. 3,775,452 and is herein referred to as "Karstedt". Karstedt's catalyst is a platinum complex formed by reacting chloroplatinic acid containing about 4 moles of water of hydration with divinyl tetramethyl disiloxane in the presence of sodium bicarbonate in an ethanol solution.

Sample 1 demonstrates that the Karstedt+dioctylfumarate mixture provides a stable catalyst system with cure comparable to Karstedt. The ratio of dioctylfumarate to Karstedt's catalyst is 1.4 equivalents of dioctylfumarate to 1 equivalent of platinum. The data also shows that Karstedt plus dioctylfumarate was the only catalyst which cured after 4 days.

Samples 1, 2, and 7 demonstrate that Karstedt+dioctylfumarate, $(M^{Vi}M^{Vi})Pt(dimethylfumarate)$, and $(M^{Vi}M^{Vi})Pt(2$-methyl-1,4-naphthoquinone) provide catalyst systems with cure comparable to Karstedt.

Sample 3 demonstrates that a catalyst without L showed poor performance with respect to % extractables.

EXAMPLE 2

In a similar fashion to that above, but employing lower initial concentrations of catalysts, and an additional substrate, Thilmany PEK (polyethylene coated kraft paper), adequate cure can be obtained at even lower levels than the above examples, and a catalyst of the present invention is more efficient in providing adequate cure at these low levels. relative to Karstedt's catalyst. The concentration of platinum catalyst was $1.00 \times 10^{-4}$ moles per liter.

TABLE 2

| Sample | Paper | Catalyst | $\mu g$ Pt/m$_2$ | % Extractables Trial 1 | Trial 2 | Average |
|---|---|---|---|---|---|---|
| 1 | AV100 | Karstedt | 220 | 7.76 | 2.05 | 4.91 |
| 2 | PEK | Karstedt | 206 | 29.76 | — | 29.76 |
| 3 | AV100 | $(M^{Vi}M^{Vi})Pt(2$-methyl-1,4-napthoquinone) | 234 | 4.60 | 2.71 | 3.66 |
| 3 | AV100 | $(M^{Vi}M^{Vi})Pt(2$-methyl-1,4-napthoquinone) | 251 | 4.19 | 0.39 | 2.29 |
| 4 | PEK | $(M^{Vi}M^{Vi})Pt(2$-methyl-1,4-napthoquinone) | 205 | 9.52 | 3.8 | 6.66 |

Samples 4 and 2 demonstrate that $(M^{Vi}M^{Vi})Pt(2$-methyl-1,4-naphthoquinone) complex gives adequate cure on PEK at approximately 200 $\mu g/m^2$, whereas Karstedt does not.

Samples 1 and 3 demonstrate that both $(M^{Vi}M^{Vi})Pt(2$-methyl-1,4-naphthoquinone) complex and Karstedt gives adequate cure on glassine (AV100) paper at approximately 200 $\mu g/m^2$.

EXAMPLE 3

A catalytically active substrate was provided by coating platinum catalysts onto Krammerer AV 100 R® glassine using a Dixon Pilot Coater configured with an applicator roll and #8 Meyer bar. A hexane solution of the platinum catalyst was charged to the reservoir. The substrate web was fed at 30 feet per minute (ft/min) past the applicator roll turning at 15 feet per minute and the Meyer bar. After passing the Meyer bar, the web was fed through an oven set at 166° F. in order to remove the hexane.

Since the objective was to coat a single side of the substrate, it was desirable that the catalyst remain on coated side without migrating or transferring to the opposite (back) side of the substrate. To test for migration or transferring of the catalyst, a small (about 12"×12") sample slip sheet was inserted between layers of the substrate as it was rewound. After the run was complete, the slip sheet was removed and tested for platinum content. The platinum content of the slip sheet and the web were compared to determine the amount of platinum catalyst coated on the back side of the roll. A low amount of platinum transfer (<10%) is an advantage as it indicates that the process can be done in steps if desired, with the platinum being coated first, and then rolled and stored for later use in a coating step. Alternatively the platinum catalyst coating followed by silicone coating could be done in a single continuous process if desired.

TABLE 3

| Catalyst | Concentration (ppm) | Web speed (ft/min) | Pt ($\mu g/m^2$) | Pt on slip ($\mu g/m^2$) | Transfer percent |
|---|---|---|---|---|---|
| Karstedt | 500 | 30 | 1185 | 110 | 9.5 |
| $(M^{Vi}M^{Vi})Pt(2$-methyl-1,4-napthoquinone) | 250 | 30 | 281 | 5 | <1.77 |

The results demonstrate that the $(M^{Vi}M^{Vi})Pt(2$-methyl1,4-naphthoquinone) catalyst can be applied to a paper substrate on a commercial pilot coater. In addition, there is little transfer of catalyst face to the back side of the substrate on winding.

EXAMPLE 4

Once the platinum was coated using a Meyer bar configuration, the Dixon Pilot Coater was reconfigured for application of the silicone components using a three roll differential offset gravure coating setup. The platinized substrates from the previous experiments were fed at the indicated web speeds past the applicator rolls and then through a 10 foot oven set at 166° F. The silicone solution consisted of a mixture of 100 parts of a divinyl siloxane (GE Silicones' SL6100) and 2.5 parts of a hydrido siloxane (GE Silicones' SL6020). None of the hydrosilylation inhibitors normally required for these types of solventless silicone release coatings were added.

Once cured in the oven, the substrate was rewound onto a roll. Samples were taken for silicone coat weight, back side coat weight and total % extractables. The coat weight indicates the amount of silicone coated of the face of the substrate and normally is in the range between about 0.6 pounds/ream and about 0.9 pounds/ream. A low value for the back side coat weight is an indication that the silicone layer is cured sufficiently before rewinding so as not to transfer off the coated side of the substrate. Excessive transfer may result in losing release capability on the desired face and/or "blocking" the substrate by gluing the roll together. The results below demonstrate that the $(M^{Vi}M^{Vi})Pt(2$-methyl-1,4-naphthoquinone) catalyst cures the, silicone release coating enough to prevent transfer of silicone to the back side of the, substrate.

TABLE 4

| Run Speed (feet/minute) | Silicone Coat Weight (pounds/ream) | Back Side Silicone Coat Weight (pounds/ream) |
| --- | --- | --- |
| 50 | 0.959 | 0.0 |
| 75 | 0.987 | 0.0 |
| 100 | 1.012 | 0.0 |

A second indication of cure is the % extractables, which is a measure of how much material in the silicone solution did not react into the silicone polymer network. A high percent extractable indicates the reaction did not reach completion during the allotted time in the oven. Post cure, as measured by the percent extractables after twenty-four hours, indicates how much farther toward completion the polymerization goes after twenty hours after coating.

TABLE 5

| Catalyst | Pt on Paper Concentration (μg/m²) | Run Speed (ft/min) | % Extractables | % Extractables Post Cure |
| --- | --- | --- | --- | --- |
| $(M^{Vi}M^{Vi})Pt(2$-methyl-1,4-napthoquinone) | 381 | 50 | 11.1 | 1.8 |
|  | 333 | 75 | 11.0 | 1.7 |
|  | 395 | 100 | 10.0 | 1.6 |
| Karstedt | 1001 | 50 | 10.5 | 2.4 |
|  | 1001 | 75 | 11.5 | 2.4 |
|  | 1001 | 100 | 8.9 | 2.1 |

The results demonstrate that the $(M^{Vi}M^{Vi})Pt(2$-methyl-1,4-naphthoquinone) catalyst reaches the same degree of cure at about one third the catalyst level for the standard Karstedt's catalyst. Both catalytic systems reach about 90% cure under the relatively mild conditions of this test (low temperature and short residence time). Post cure of twenty hours allows the $(M^{Vi}M^{Vi})Pt(2$-methyl-1,4-naphthoquinone) catalyst to essentially reach complete reaction. No "blocking" or sticking together of the paper after rewinding was noted demonstrating that sufficient cure had been attained for unwinding and adhesive coating operations normally performed in commercial application of siliconized paper.

Current technology for hydrosilylation based silicone paper release coatings requires that an inhibitor be included in the formulation with a vinyl silicone and a hydrido silicone in order to provide stable bath life. One advantage of precoating the platinum on paper is the elimination of the inhibitor from the formulation. With no inhibitor present in the silicone solution, there was concern that platinum would be able to migrate from the paper, down the applicator roll, and into the silicone feed bath. In practice this could cause gelling of the silicone solution or viscosity build on the rollers leading to insufficient coverage on the paper. During the $(M^{Vi}M^{Vi})Pt(2$-methyl-1,4-naphthoquinone) catalyst coating experiments described for Example 4, no viscosity build was noted on the rollers and no gel was observed in the bath after more than two hours of run time.

While typical embodiments have been set forth for the purpose of illustration, the foregoing descriptions should not be deemed to be a limitation on the scope of the invention. Accordingly, various modifications, adaptations, and alternatives may occur to one skilled in the art without departing from the spirit and scope of the present invention.

What is claimed is:

1. A method of making a coated substrate comprising applying a coating composition to a substrate, wherein the coating composition comprises an alkenyl functional compound and a hydride functional compound, and the substrate comprises a catalytically effective amount of a platinum group metal catalyst having the formula $Z_xPt(0)L_y$, wherein L comprises an electron-withdrawing ester ligand, a quinone-based ligand, or combination thereof, y is in a range between about 1 and about 4, Z comprises a coordinating ligand, x is in a range between 0 and about 3, and x+y is in a range between about 2 and about 4; and allowing the coating composition to cure.

2. The method of claim 1, wherein Z comprises an organic compound with at least one alkenyl group, and x is in a range greater than 0 to about 3.

3. The method of claim 2, wherein Z comprises 1,1,3,3-tetramethyl-1,3-divinyldisiloxane $(M^{Vi}M^{Vi})$; octavinylcyclotetrasiloxane $(D_4^{Vi})$; cyclooctadiene; ethylene; or combinations thereof.

4. The method of claim 1, wherein L comprises 2-methyl-1,4-naphthoquinone, dioctylfumarate, dimethylfumarate, or combinations thereof.

5. The method of claim 1, wherein Z is 1,1,3,3-tetramethyl-1,3-divinyldisiloxane, L is 2-methyl-1,4-naphthoquinone, x is 1, and y is 1.

6. The method of claim 1, wherein Z is 1,1,3,3-tetramethyl-1,3-divinyldisiloxane, L is dioctylfumarate, x is 1, and y is in a range between about 1 and about 3.

7. The method of claim 1, wherein the alkenyl functional compound comprises an organopolysiloxane having structural units of the formula:

$$R^1_aSiO_{4-a/2}$$

wherein each $R^1$ is independently hydroxyl or a monovalent hydrocarbon radical, and a is an integer wherein $0 \leq a \leq 3$ and provided that at least two $R^1$ groups per molecule of such alkenyl functional organopolysiloxane are each independently alkenyl radicals.

8. The method of claim 1, wherein the alkenyl functional compound comprises one or more organopolysiloxane polymers or copolymers of the formula:

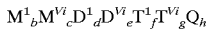

wherein $M^1$ is $R^2_3SiO_{1/2}$,
$M^{Vi}$ is $R^3_2R^4SiO_{1/2}$,
$D^1$ is $R^5_2SiO_{2/2}$,
$D^{Vi}$ is $R^6R^7SiO_{2/2}$,
$T^1$ is $R^8SiO_{3/2}$,
$T^{Vi}$ is $R^9SiO_{3/2}$,
Q is $SiO_{4/2}$,
each $R^2$, $R^3$, $R^5$, $R^6$ and $R^8$ is independently hydroxyl or a monovalent hydrocarbon radical,
each $R^4$, $R^7$ and $R^9$ is independently alkenyl,
b, c, d, e, f, g and h are each integers selected to provide polymer a having a viscosity in a range between about 50 centiStokes and about 50,000 centiStokes, provided at least one of c, e and g is greater than 0 and the alkenyl functional organopolysiloxane contains at least two alkenyl radicals per molecule.

9. The method of claim 1, wherein the hydride functional compound comprises an organopolysiloxane having structural units of the structural formula:

wherein each $R^{10}$ is independently H or a monovalent hydrocarbon radical, and i is an integer wherein $0 \leq i \leq 3$, provided that at least two $R^{10}$ groups per molecule of such hydride functional organopolysiloxane are each hydrogen.

10. The method of claim 1, wherein the hydride functional compound comprises one or more organopolysiloxanes of the structural formula:

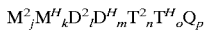

wherein $M^2$ is $R^{11}_3SiO_{1/2}$,
$M^H$ is $R^{12}_2R^{13}SiO_{1/2}$,
$D^2$ is $R^{14}_2SiO_{2/2}$,
$D^H$ is $R^{15}R^{16}SiO_{2/2}$,
$T^2$ is $R^{17}SiO_{3/2}$,
$T^H$ is $R^{18}SiO_{3/2}$,
Q is $SiO_{4/2}$,
each $R^{11}$, $R^{12}$, $R^{14}$, $R^{15}$ and $R^{17}$ is independently a monovalent hydrocarbon radical,
$R^{13}$, $R^{16}$ and $R^{18}$ are each hydrogen,
j, k, l, m, n, o and p are each integers selected to provide a polymer having a viscosity in a range between about 1 centiStokes and about 1000 centiStokes, provided at least one of k, m and o is greater than 0 and the hydride functional organopolysiloxane contains at least two silicon-bonded hydrogen radicals per molecule.

11. The method of claim 1, wherein the substrate comprises paper, a polymer film, a metal foil or a combination thereof.

12. The method of claim 1, wherein the catalytically effective amount of organoplatinum complex is an amount greater than about 0.000001 gram of organoplatinum complex per square meter of substrate surface.

13. The method of claim 12, wherein the catalytically effective amount of organoplatinum complex is an amount in a range between about 0.00005 grams and about 0.01 grams of organoplatinum complex per square meter of substrate surface.

14. The method of claim 13, wherein the catalytically effective amount of organoplatinum complex is an amount in a range between about 0.0005 grams and about 0.001 grams of precious metal per square meter of substrate surface.

15. The method of claim 1, wherein a layer of the coating composition is applied to the substrate by spray coating, roll coating, rod coating or extrusion.

16. The method of claim 1, wherein the layer of coating composition is allowed to cure at uncontrolled ambient temperature or at an elevated temperature.

17. The method of claim 16, wherein the layer of coating composition is allowed to cure at uncontrolled ambient temperature.

18. The method of claim 16, further comprising allowing the layer of coating composition to cure at an elevated temperature of up to about 100° C.

19. A method of making a coated substrate comprising applying a layer of a first component of a coating composition to the substrate, said first component comprising an alkenyl functional organopolysiloxane and a catalytically effective amount of a platinum group metal catalyst having the formula $Z_xPt(0)L_y$, wherein L comprises an electron-withdrawing ester ligand, a quinone-based ligand, or combination thereof, y is in a range between about 1 and about 4, Z comprises a coordinating ligand, x is in a range between 0 and about 3, and x+y is in a range between about 2 and about 4;
applying a layer of a second component of the coating composition to said layer of the first component, said second component comprising a hydride functional organopolysiloxane;
and allowing the layers of coating composition to cure.

20. The method of claim 19, wherein Z comprises an organic compound with at least one alkenyl group, and x is in a range greater than 0 to about 3.

21. The method of claim 20, wherein Z comprises 1,1,3,3-tetramethyl-1,3-divinyldisiloxane ($M^{Vi}M^{Vi}$); octavinylcyclotetrasiloxane ($D_4^{Vi}$); cyclooctadiene; ethylene; or combinations thereof.

22. The method of claim 19, wherein L comprises 2-methyl-1,4-naphthoquinone, dioctylfumarate, dimethylfumarate, or combinations thereof.

23. The method of claim 19, wherein Z is 1,1,3,3-tetramethyl-1,3-divinyldisiloxane, L is 2-methyl-1,4-naphthoquinone, x is 1, and y is 1.

24. The method of claim 19, wherein Z is 1,1,3,3-tetramethyl-1,3-divinyldisiloxane, L is dioctylfumarate, x is 1, and y is in a range between about 1 and about 3.

25. A method of making a coated substrate comprising applying a layer of a coating composition, said coating composition comprising an organopolysiloxane having both alkenyl and hydride radicals present on the same molecule, to the substrate, said substrate comprising a catalytically effective amount of a platinum group metal catalyst having the formula $Z_xPt(0)L_y$ wherein L comprises an electron-withdrawing ester ligand, a quinone-based ligand, or combination thereof, y is in a range between about 1 and about 4, Z comprises a coordinating ligand, x is in a range between 0 and about 3, and x+y is in a range between about 2 and about 4;
and allowing the layer to cure.

26. The method of claim 25, wherein Z comprises an organic compound with at least one alkenyl group, and x is in a range greater than 0 to about 3.

27. The method of claim 26, wherein Z comprises 1,1,3,3-tetramethyl-1,3-divinyldisiloxane ($M^{Vi}M^{Vi}$); octavinylcyclotetrasiloxane ($D_4^{Vi}$); cyclooctadiene; ethylene; or combinations thereof.

28. The method of claim 25, wherein L comprises 2-methyl-1,4-naphthoquinone, dioctylfumarate, dimethylfumarate, or combinations thereof.

29. The method of claim 25, wherein Z is 1,1,3,3-tetramethyl-1,3-divinyldisiloxane, L is 2-methyl-1,4-naphthoquinone, x is 1, and y is 1.

30. The method of claim 25, wherein Z is 1,1,3,3-tetramethyl-1,3-divinyldisiloxane, L is dioctylfumarate, x is 1, and y is in a range between about 1 and about 3.

31. The method of claim 25, wherein the organopolysiloxane comprises one or more organopolysiloxanes of the formula:

$$M^1_q M^{Vi}_r M^H_s D^1_t D^{Vi}_u D^H_v T^1_w T^{Vi}_x T^H_y Q_z$$

wherein $M^1$ is $R^2_3 SiO_{1/2}$,
$M^{Vi}$ is $R^3_2 R^4 SiO_{1/2}$,
$D^1$ is $R^5_2 SiO_{2/2}$,
$D^{Vi}$ is $R^6 R^7 SiO_{2/2}$,
$T^1$ is $R^8 SiO_{3/2}$,
$T^{Vi}$ is $R^9 SiO_{3/2}$,
Q is $SiO_{4/2}$,
$M^H$ is $R^{12}_2 R^{13} SiO_{1/2}$,
$D^H$ is $R^{15} R^{16} SiO_{2/2}$,
$T^H$ is $R^{18} SiO_{3/2}$,
each $R^2$, $R^3$, $R^5$, $R^6$ and $R^8$ is independently hydroxyl or a monovalent hydrocarbon radical,
each $R^{12}$ and $R^{15}$ is independently a monovalent hydrocarbon radical,
each $R^4$, $R^7$ and $R^9$ is independently alkenyl,
each $R^{13}$, $R^{16}$ and $R^{18}$ is each hydrogen,
and each q, r, s, t, u, v, w, x, y and z are each integers selected to provide a polymer having a viscosity in the range between about 50 centiStokes and about 50,000 centiStokes, provided that each molecule contains at least two alkenyl groups and at least two silicon-bonded H radicals, wherein the total number of alkenyl groups and silicon-bonded H radicals on the molecule is at least five.

32. A coated substrate made by the process of claim 25.

33. A system for making a coated substrate comprising a coating composition, said coating composition comprising an alkenyl functional compound and a hydride functional compound, and a substrate having a catalytically effective amount of a platinum group metal catalyst having the formula $Z_x Pt(0) L_y$, wherein L comprises an electron-withdrawing ester ligand, a quinone-based ligand, or combination thereof, y is in a range between about 1 and about 4, Z comprises a coordinating ligand, x is in a range between 0 and about 3, and x+y is in a range between about 2 and about 4, wherein the catalyst is disposed on at least one surface of the substrate in an amount effective to cure the coating composition when the coating composition is applied to the substrate.

34. The method of claim 33, wherein Z comprises an organic compound with at least one alkenyl group, and x is in a range greater than 0 to about 3.

35. The system of claim 34, wherein Z comprises 1,1,3,3-tetramethyl-1,3-divinyldisiloxane ($M^{Vi}M^{Vi}$); octavinylcyclotetrasiloxane ($D_4^{Vi}$); cyclooctadiene; ethylene; or combinations thereof.

36. The system of claim 33, wherein L comprises 2-methyl-1,4-naphthoquinone, dioctylfumarate, dimethylfumarate, or combinations thereof.

37. The system of claim 33, wherein Z is 1,1,3,3-tetramethyl-1,3-divinyldisiloxane, L is 2-methyl-1,4-naphthoquinone, x is 1, and y is 1.

38. The system of claim 33, wherein Z is Karstedt's catalyst, L is dioctylfumarate, x is 1, and y is in a range between about 1 and about 3.

39. The system of claim 33, wherein the substrate is selected from papers, polymers films, metal foils and combinations thereof.

40. The system of claim 33, wherein the alkenyl functional compound comprises an organopolysiloxane comprising structural units of the formula:

$$R^1_a SiO_{4-a/2}$$

wherein each $R^1$ is independently hydroxyl or a monovalent hydrocarbon radical, and a is an integer wherein $0 \leq a \leq 3$ and provided that at least two $R^1$ groups per molecule of such alkenyl functional organopolysiloxane are each independently alkenyl radicals.

41. The system of claim 33, wherein the alkenyl functional compound comprises one or more organopolysiloxane polymers or copolymers of the formula:

$$M^1_b M^{Vi}_c D^1_d D^{Vi}_e T^1_f T^{Vi}_g Q_h$$

wherein:
$M^1$ is $R^2_3 SiO_{1/2}$,
$M^{Vi}$ is $R^3_2 R^4 SiO_{1/2}$,
$D^1$ is $R^5_2 SiO_{2/2}$,
$D^{Vi}$ is $R^6 R^7 SiO_{2/2}$,
$T^1$ is $R^8 SiO_{3/2}$,
$T^{Vi}$ is $R^9 SiO_{3/2}$,
Q is $SiO_{4/2}$,
each $R^2$, $R^3$, $R^5$, $R^6$ and $R^8$ is independently hydroxyl or a monovalent hydrocarbon radical,
each $R^4$, $R^7$ and $R^9$ is independently alkenyl,
b, c, d, e, f, g and h are each integers selected to provide polymer a having a viscosity in a range between about 50 centiStokes and about 50,000 centiStokes, provided at least one of c, e and g is greater than 0 and the alkenyl functional organopolysiloxane contains at least two alkenyl radicals per molecule.

42. The system of claim 33, wherein the hydride functional compound comprises an organopolysiloxane comprising structural units of the structural formula:

$$R^{10}_i SiO_{4-i/2}$$

wherein each $R^{10}$ is independently hydrogen or a monovalent hydrocarbon radical, and i is an integer wherein $0 \leq i \leq 3$, provided that at least two $R^{10}$ groups per molecule of such hydride functional organopolysiloxane are each hydrogen.

43. The system of claim 33, wherein the hydride functional compound comprises one or more organopolysiloxanes of the structural formula:

$$M^2_j M^H_k D^2_l D^H_m T^2_n T^H_o Q_p$$

wherein $M^2$ is $R^{11}_3 SiO_{1/2}$,
$M^1$ is $R^{12}_2 R^{13} SiO_{1/2}$,
$D^2$ is $R^{14}_2 SiO_{2/2}$, $D^H$ is $R^{15}R^{16}SiO_{2/2}$,
$T^2$ is $R^{17}SiO_{3/2}$,
$T^H$ is $R^{18}SiO_{3/2}$,
Q is $SiO_{4/2}$,
each $R^{11}$, $R^{12}$, $R^{14}$, $R^{15}$ and $R^{17}$ is independently a monovalent hydrocarbon radical,
$R^{13}$, $R^{16}$ and $R^{18}$ are each hydrogen,
j, k, l, m, n, o and p are each integers selected to provide a polymer with a viscosity in a range between about 1 centiStokes and about 1000 centiStokes, provided at least one of k, m and o is greater than 0 and the hydride functional organopolysiloxane contains at least two silicon-bonded hydrogen radicals per molecule.

44. The system of claim 33, wherein the alkenyl functional compound and the hydride functional compound comprise one or more organopolysiloxanes of the formula:

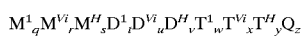

wherein $M^1$ is $R^2{}_3SiO_{1/2}$,
$M^{Vi}$ is $R^3{}_2R^4SiO_{1/2}$,
$D^1$ is $R^5{}_2SiO_{2/2}$,
$D^{Vi}$ is $R^6R^7SiO_{2/2}$,
$T^1$ is $R^8SiO_{3/2}$,
$T^{Vi}$ is $R^9SiO_{3/2}$,
Q is $SiO_{4/2}$,
$M^H$ is $R^{12}{}_2R^{13}SiO_{1/2}$,
$D^H$ is $R^{15}R^{16}SiO_{2/2}$,
$T^H$ is $R^{18}SiO_{3/2}$,
each $R^2$, $R^3$, $R^5$, $R^6$ and $R^8$ is independently hydroxyl or a monovalent hydrocarbon radical,
each $R^{12}$ and $R^{15}$ is independently a monovalent hydrocarbon radical,
each $R^4$, $R^7$ and $R^9$ is independently alkenyl,
each $R^{13}$, $R^{16}$ and $R^{18}$ is each hydrogen,
and each q, r, s, t, u, v, w, x, y and z are each integers selected to provide a polymer having a viscosity in the range between about 50 centiStokes and about 50,000 centiStokes, provided that each molecule contains at least two alkenyl groups and at least two silicon-bonded H radicals, wherein the total number of alkenyl groups and silicon-bonded H radicals on the molecule is at least five.

45. The system of claim 33, wherein the organoplatinum complex is disposed on at least one surface of the substrate in an amount greater than about 0.000001 gram of organoplatinum complex per square meter of substrate surface.

46. The system of claim 45, wherein the organoplatinum complex is disposed on at least one surface of the substrate in an amount in a range between about 0.00005 grams and about 0.01 grams of organoplatinum complex per square meter of substrate surface.

47. The system of claim 46, wherein the organoplatinum complex is disposed on at least one surface of the substrate in an amount in a range between about 0.0005 grams and about 0.001 grams of precious metal per square meter of substrate surface.

48. A method for making a catalyzed article comprising applying an effective amount of a platinum group metal catalyst having the formula $Z_xPt(0)L_y$, wherein Z is 1,1,3,3-tetramethyl-1,3-divinyldisiloxane, L is 2-methyl-1,4-naphthoquinone, x is 1, and y is 1 to at least one surface of a substrate; and making a dilute form of the catalyst, wherein the catalyst is applied to the substrate as the dilute form of the catalyst wherein the dilute catalyst is formed by dispersing the catalyst in a binder composition comprising a polymer latex and an inorganic filler.

49. A method for making a catalyzed article comprising applying an effective amount of a platinum group metal catalyst having the formula $Z_xPt(0)L_y$, wherein Z is 1,1,3,3-tetramethyl-1,3-divinyldisiloxane, L is 2-methyl-1,4-naphthoquinone, x is 1, and y is 1 to at least one surface of a substrate; and making a dilute form of the catalyst, wherein the catalyst is applied to the substrate as the dilute form of the catalyst wherein the dilute catalyst is formed by dispersing the catalyst in a film-forming polymer composition the film comprising a film-forming polyvinyl alcohol composition or a film-forming polyacrylate composition.

50. A method for making a catalyzed article comprising applying an effective amount of a platinum group metal catalyst having the formula $Z_xPt(0)L_y$, wherein Z is 1,1,3,3-tetramethyl-1,3-divinyldisiloxane, L is 2-methyl-1,4-naphthoquinone, x is 1, and y is 1 to at least one surface of a substrate; and making a dilute form of the catalyst, wherein the catalyst is applied to the substrate as the dilute form of the catalyst wherein the dilute catalyst is formed by dispersing the catalyst in a binder composition comprising a polymer latex and an inorganic filler.

51. A method for making a catalyzed article comprising applying an effective amount of a platinum group metal catalyst having the formula $Z_xPt(0)L_y$, wherein Z is 1,1,3,3-tetramethyl-1,3-divinyldisiloxane, L is 2-methyl-1,4-naphthoquinone, x is 1, and y is 1 to at least one surface of a substrate; and making a dilute form of the catalyst, wherein the catalyst is applied to the substrate as the dilute form of the catalyst wherein the dilute catalyst is formed by dispersing the catalyst in a film-forming polymer composition the film comprising a film-forming polyvinyl alcohol composition or a film-forming polyacrylate composition.

* * * * *